US012654792B2

(12) United States Patent
Fu et al.

(10) Patent No.: US 12,654,792 B2
(45) Date of Patent: Jun. 16, 2026

(54) HYBRID VEHICLE WITH A VARIABLE GEOMETRY CHASSIS

(71) Applicants:Hyundai Motor Company, Seoul (KR); Kia Corporation, Seoul (KR)

(72) Inventors: Ernestine Fu, Somerville, MA (US); John Suh, Palo Alto, CA (US); Alec Taraborrelli, Superior Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 485 days.

(21) Appl. No.: 18/302,898

(22) Filed: Apr. 19, 2023

(65) Prior Publication Data

US 2024/0351648 A1 Oct. 24, 2024

(51) Int. Cl.
B62D 57/028 (2006.01)

(52) U.S. Cl.
CPC .................................. B62D 57/028 (2013.01)

(58) Field of Classification Search
None
See application file for complete search history.

(56) References Cited

FOREIGN PATENT DOCUMENTS

| CN | 202657137 | U | | 1/2013 | |
|----|-----------|---|---|--------|---|
| CN | 108327812 | A | * | 7/2018 | .......... B62D 57/028 |
| CN | 214604417 | U | | 11/2021 | |
| CN | 114560026 | A | * | 5/2022 | .......... B62D 57/028 |
| CN | 111942491 | B | * | 6/2022 | .......... B62D 57/028 |
| CN | 115416775 | A | * | 12/2022 | .......... B62D 57/028 |
| KR | 10-2021-0081578 | A | | 7/2021 | |

* cited by examiner

*Primary Examiner* — Vicky A Johnson
(74) *Attorney, Agent, or Firm* — Fox Rothschild LLP

(57) ABSTRACT

A hybrid vehicle is provided. The hybrid vehicle may comprise a variable geometry chassis and a plurality of leg-wheel components coupled to the variable geometry chassis. The plurality of leg-wheel components may be collectively operable to provide wheeled locomotion and walking locomotion. The variable geometry chassis may comprise a plurality of components. The plurality of components may comprise a main component, a plurality of bridge components, and a plurality of end components. The main component may be coupled to an end component of the plurality of end components via a bridge component of the plurality of bridge components. The variable geometry chassis may be configurable into one or more of an arch configuration, a flat configuration, and a tub configuration.

15 Claims, 15 Drawing Sheets

HYBRID VEHICLE WITH A VARIABLE GEOMETRY CHASSIS

BACKGROUND

Technical Field

Embodiments of the present disclosure relate to hybrid vehicles having a variable geometry chassis.

Background

New motor vehicles that are capable of wheeled and walking motion may be capable of omnidirectional movement (e.g., being configured to walk in a walking mode). The ability to travel using both wheeled and walking locomotion allows these vehicles, also referred to as "hybrid" vehicles, to navigate over rugged and undrivable terrain, opening up opportunities for exploration, search and rescue, military operations, etc. However, even while being given access to previously inaccessible terrain, hybrid vehicles may still encounter impassable obstructions or terrain, requiring additional support or functionality to overcome such obstacles.

SUMMARY

According to an object of the present disclosure, a hybrid vehicle is provided. The hybrid vehicle may comprise a variable geometry chassis and a plurality of leg-wheel components coupled to the variable geometry chassis. The plurality of leg-wheel components may be collectively operable to provide wheeled locomotion and walking locomotion.

According to an exemplary embodiment, the variable geometry chassis may comprise a plurality of components.

According to an exemplary embodiment, the plurality of components may comprise a main component, a plurality of bridge components, and a plurality of end components. The main component may be coupled to an end component of the plurality of end components via a bridge component of the plurality of bridge components.

According to an exemplary embodiment, the variable geometry chassis may be configurable into an arch configuration wherein, in the arch configuration, the main component is positioned above the plurality of end components.

According to an exemplary embodiment, the variable geometry chassis may be configurable into a flat configuration wherein, in the flat configuration, the main component, the plurality of bridge components, and the plurality of end components are positioned in a same level relative to each other.

According to an exemplary embodiment, the variable geometry chassis may be configurable into a tub configuration wherein, in the tub configuration, the main component is positioned below the plurality of end components.

According to an exemplary embodiment, the variable geometry chassis may further comprise a plurality of rotational locking mechanisms configured to secure the plurality of components.

According to an exemplary embodiment, the plurality of locking mechanisms may be configured to rotate a relative positioning of the plurality of components.

According to an exemplary embodiment, the plurality of locking mechanisms may be configured to lock the plurality of components in a fixed configuration.

According to an object of the present disclosure, a hybrid vehicle is provided. The hybrid vehicle may comprise a variable geometry chassis. The variable geometer chassis may comprise a plurality of components, comprising a main component, a plurality of bridge components, and a plurality of end components. The variable geometry chassis may further comprise a plurality of rotational locking mechanisms configured to secure the plurality of components. The hybrid vehicle may further comprise a plurality of leg-wheel components coupled to the variable geometry chassis. The plurality of leg-wheel components may be collectively operable to provide wheeled locomotion and walking locomotion.

According to an exemplary embodiment, the main component may be coupled to an end component of the plurality of end components via a bridge component of the plurality of bridge components.

According to an exemplary embodiment, the variable geometry chassis may be configurable into an arch configuration wherein, in the arch configuration, the main component is positioned above the plurality of end components.

According to an exemplary embodiment, the variable geometry chassis may be configurable into a flat configuration wherein, in the flat configuration, the main component, the plurality of bridge components, and the plurality of end components are positioned in a same level relative to each other.

According to an exemplary embodiment, the variable geometry chassis may be configurable into a tub configuration wherein, in the tub configuration, the main component is positioned below the plurality of end components.

According to an exemplary embodiment, the plurality of locking mechanisms may be configured to rotate a relative positioning of the plurality of components.

According to an exemplary embodiment, the plurality of locking mechanisms may be configured to lock the plurality of components in a fixed configuration.

According to an exemplary embodiment, the plurality of rotational locking mechanisms may comprise a rotational locking mechanism between the main component and one of the plurality of bridge components.

According to an exemplary embodiment, an end of the main component may be coupled to two active components and one passive component of the rotational locking mechanism, and an end of the bridge components may be coupled to two passive components of the rotational locking mechanism.

According to an exemplary embodiment, the plurality of rotational locking mechanisms may comprise a rotational locking mechanism between a bridge component of the plurality of bridge components and an end component of the plurality of end components.

According to an exemplary embodiment, an end of the bridge components may be coupled to two passive components of the rotational locking mechanism, and a side of the end component may be coupled to two active components and one passive component of the rotational locking mechanism.

BRIEF DESCRIPTION OF THE DRAWINGS

The accompanying drawings, which are incorporated in and form a part of the Detailed Description, illustrate various non-limiting and non-exhaustive embodiments of the subject matter and, together with the Detailed Description, serve to explain principles of the subject matter discussed below Unless specifically noted, the drawings referred to in this Brief Description of Drawings should be understood as not being drawn to scale and like reference numerals refer to like parts throughout the various figures unless otherwise specified.

DETAILED DESCRIPTION

Figure 1:
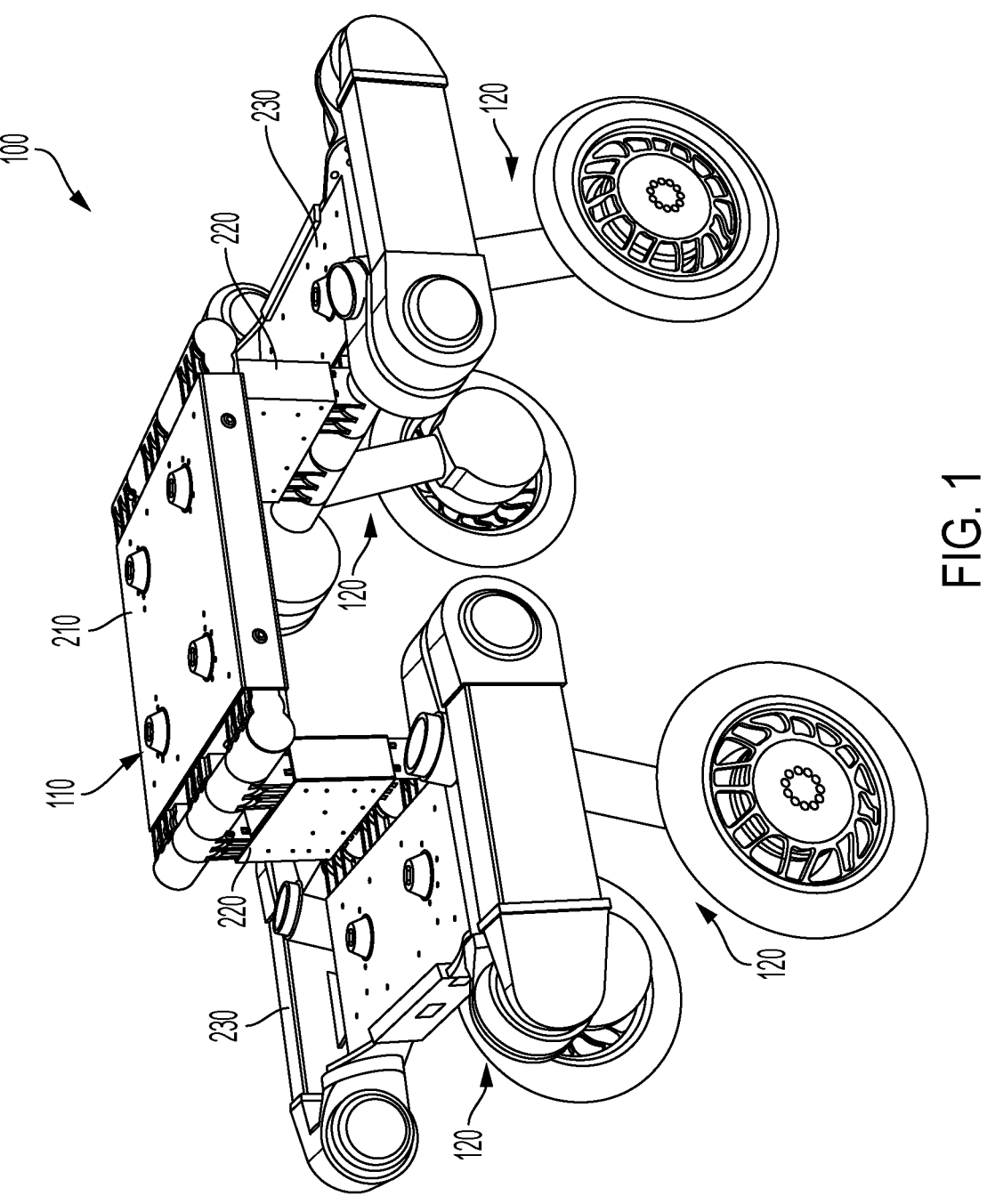
FIG. 1 illustrates a perspective view of an example hybrid vehicle with a variable geometry chassis in an arch configuration, according to an exemplary embodiment of the present disclosure.

The following Detailed Description is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving," "controlling," "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid powered vehicles, electric vehicles, plug-in hybrid electric vehicles, hydrogen-powered vehicles and other alternative fuel vehicles (e.g. fuels derived from resources other than petroleum). As referred to herein, a hybrid powered vehicle is a vehicle that has two or more sources of power, for example both gasoline-powered and electric-powered vehicles. In aspects, a vehicle may comprise an internal combustion engine system as disclosed herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically crasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

According to an exemplary embodiment, a vehicle comprising leg-wheel components configured to perform locomotion using both walking motion and rolling traction, also referred to herein as a "hybrid vehicle," with a variable geometry chassis is provided. According to an exemplary embodiment, the hybrid vehicle may comprise a plurality of leg-wheel components that are configured to provide the walking and wheeled modes of locomotion. The hybrid vehicle, in accordance with an exemplary embodiment, may be configured to vary the geometry of the chassis according to a desired function. According to an exemplary embodiment, the hybrid vehicle may comprise a body-on-chassis architecture, allowing the hybrid vehicle to be configured with different bodies, where a variable geometry chassis itself may also be physically reconfigured to adopt the shape which best supports the hybrid vehicle's intended role/use.

According to an exemplary embodiment, the variable geometry chassis may be configurable during operation. According to an exemplary embodiment, the variable geometry chassis may comprise a plurality of components that are linked together via one or more connection mechanisms that are configured to allow for movement of the plurality of components relative to each other during reconfiguration of the geometry of the chassis, and be fixed in place for maintaining a selected geometry. According to an exemplary embodiment, the variable geometry chassis may comprise a main component, two end components, and two bridge components each between the main component and one of the two end components, where each component may be connected to adjacent component(s) via a rotational locking mechanism (also referred to herein as a "knuckle").

Referring now to FIG. 1, a perspective view of an example hybrid vehicle 100 with a variable geometry chassis 110 in an arch configuration is illustratively depicted, in accordance with an exemplary embodiment of the present disclosure.

According to an exemplary embodiment, the hybrid vehicle 100 may comprise four leg-wheel components 120, each configured to perform/move with at least two degrees of freedom. As illustrated in FIG. 1, the hybrid vehicle 100 may be a passenger-free vehicle. However, it should be appreciated that the hybrid vehicle 100, in some exemplary embodiments, may comprise a passenger compartment configured to hold and/or transport one or more people. It should be appreciated that the hybrid vehicle 100 may be configured to be operated remotely, operated autonomously, and/or a combination thereof. According to an exemplary embodiment, when the hybrid vehicle 100 comprises one or more passenger compartments, the hybrid vehicle 100 may be configured to be operated within the one or more passenger compartments.

According to an exemplary embodiment, the one or more leg-wheel components 120 may be configured to perform/move with at least six degrees of freedom. It should be appreciated that, while the leg-wheel components 120 may be controlled collectively to provide rolling and walking locomotion, each leg-wheel component 120 may be configured to be capable of different movement or positioning during operation. For example, while using wheeled locomotion on an upward slope, in order to maintain a body of the hybrid vehicle 100 level with flat ground, the front leg-wheel components 120 may be retracted and the rear leg-wheel components 120 be extended. In another example, while using walking locomotion to traverse rough terrain, each leg-wheel component 120 and/or opposite pairs of the leg-wheel components 120 (e.g., front left and rear right), may be configured to move differently from the other leg-wheel components 120. According to an exemplary embodiment, the leg-wheel components 120 may be configured to operate to move the hybrid vehicle 100 in any direction of travel, and may be configured to change directions at any time.

According to an exemplary embodiment, various aspects of control for the hybrid vehicle 100 may be configured to be controlled by an operator and/or the hybrid vehicle 100 itself, depending on an operation mode. In general, a number of aspects of the operation may be subject to different types of operator control. For example, aspects that may be controlled in operating the hybrid vehicle 100 may comprise the objectives of the hybrid vehicle 100, the destination of the hybrid vehicle 100, the speed and/or direction of travel of the hybrid vehicle 100, the type and/or types of locomotion used (e.g., wheeled, walking, or a combination) for the hybrid vehicle 100, the position of one or more legs of the hybrid vehicle 100 when the hybrid vehicle 100 is in a walking locomotion mode of operation, controlling the walking gait when in the walking locomotion mode of operation, and/or other suitable aspects that may be controlled in operating the hybrid vehicle 100. According to an exemplary embodiment, in controlling the operation of the hybrid vehicle 100, different vehicle operation modes are described that afford different types of operation to the hybrid vehicle 100 operator. In general, the vehicle operation modes may cover modes in which an operator (e.g., onboard and/or remote) is in complete control of vehicle operation to modes in which an operator may provide the hybrid vehicle 100 with one or more objectives that the hybrid vehicle 100 may be configured to interpret, which the hybrid vehicle 100 may then implement to accomplish the one or more objectives.

According to an exemplary embodiment, the hybrid vehicle 100, may be configured to be capable of varying a geometry of the chassis 110 according to a desired function. According to an exemplary embodiment, the hybrid vehicle 100 may comprise a body-on-chassis architecture, enabling the hybrid vehicle to be configured with one or more different bodies. According to an exemplary embodiment, a variable geometry chassis 110 itself may also be physically reconfigured to adopt the shape which best supports the hybrid vehicle 100's intended role.

According to an exemplary embodiment, the variable geometry chassis 110 may be configured to be configurable during operation. According to an exemplary embodiment, the variable geometry chassis 110 may comprise a plurality of components that are linked together via one or more connection mechanisms that allow for movement of the plurality of components relative to each other during reconfiguration of the geometry of the chassis 110, and may be fixed in place for maintaining a selected geometry. According to an exemplary embodiment, the variable geometry chassis 110 may comprise a main component 210, two end components 230, and two bridge components 220, each between the main component and one of the end components, where each component may be configured to be connected to one or more adjacent component(s) via one or more rotational locking mechanisms.

Figure 2:
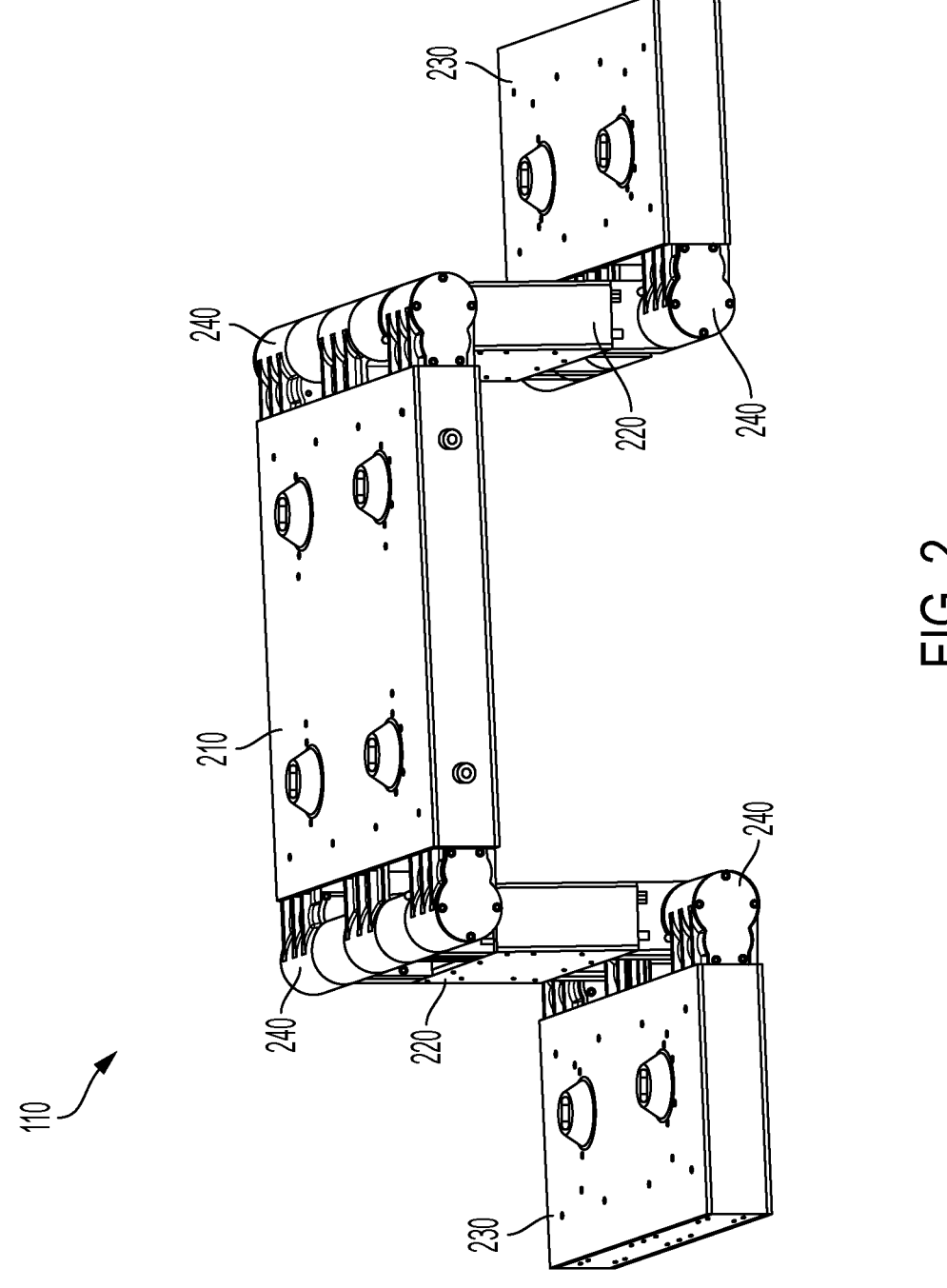
FIG. 2 illustrates a perspective view of an example variable geometry chassis in an arch configuration, according to an exemplary embodiment of the present disclosure.

Referring now to FIG. 2, a perspective view of an example variable geometry chassis 110 of a hybrid vehicle 100 in an arch configuration is illustratively depicted, in accordance with an exemplary embodiment of the present disclosure.

According to an exemplary embodiment, the variable geometry chassis 110 may comprise a main component 210, two end components 230, and two bridge components 220 each between the main component 210 and one of the end components 230. According to an exemplary embodiment, each component may be connected to an adjacent component(s) via a rotational locking mechanism 240. According to an exemplary embodiment, each rotational locking mechanism 240 may comprise one or more passive components and one or more active components, wherein the active components are configured to rotate in relation to the passive components, enabling rotational movement between the main component 210, two end components 230, and two bridge components 220. According to an exemplary embodiment, each end of the main component 210 may be coupled to two active components and one passive component of the rotational locking mechanism 240, each end of the bridge components 220 may be coupled to two passive components of the rotational locking mechanism 240, and one side of the end component 230 may be coupled to two active components and one passive component of the rotational locking mechanism 240. According to an exemplary embodiment, each of the one or more leg-wheel components 120 may be configured to be coupled to an end component 230.

Figure 3A:
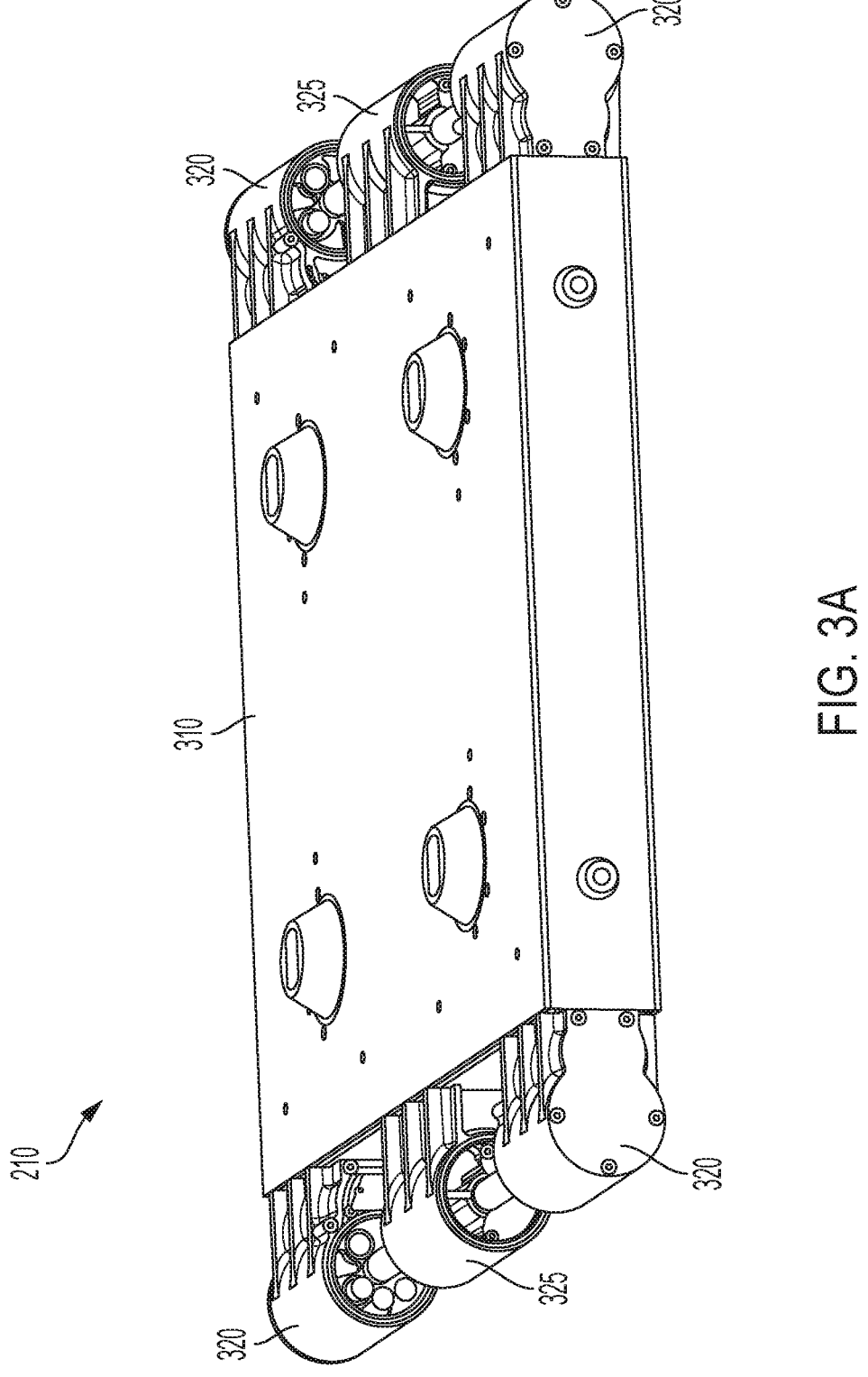
FIG. 3A illustrates a perspective view of an example main component of a variable geometry chassis, according to an exemplary embodiment of the present disclosure.

Referring now to FIG. 3A, a perspective view of an example main component 210 of a variable geometry chassis 110 is illustratively depicted, in accordance with an exemplary embodiment of the present disclosure.

According to an exemplary embodiment, the main component 210 may be a center component of the variable geometry chassis 110. According to an exemplary embodiment, the main component 210 may comprise a main component body 310, one or more active components 320 of a rotational locking mechanism 240, and one or more passive components 325 of a rotational locking mechanism 240. According to an exemplary embodiment, the active components 320 and passive component 325 of the rotational locking mechanisms 240 may be configured to engage with, and rotationally couple with, the passive components 325 of the rotational locking mechanisms of one or more bridge components 220.

Figure 3B:
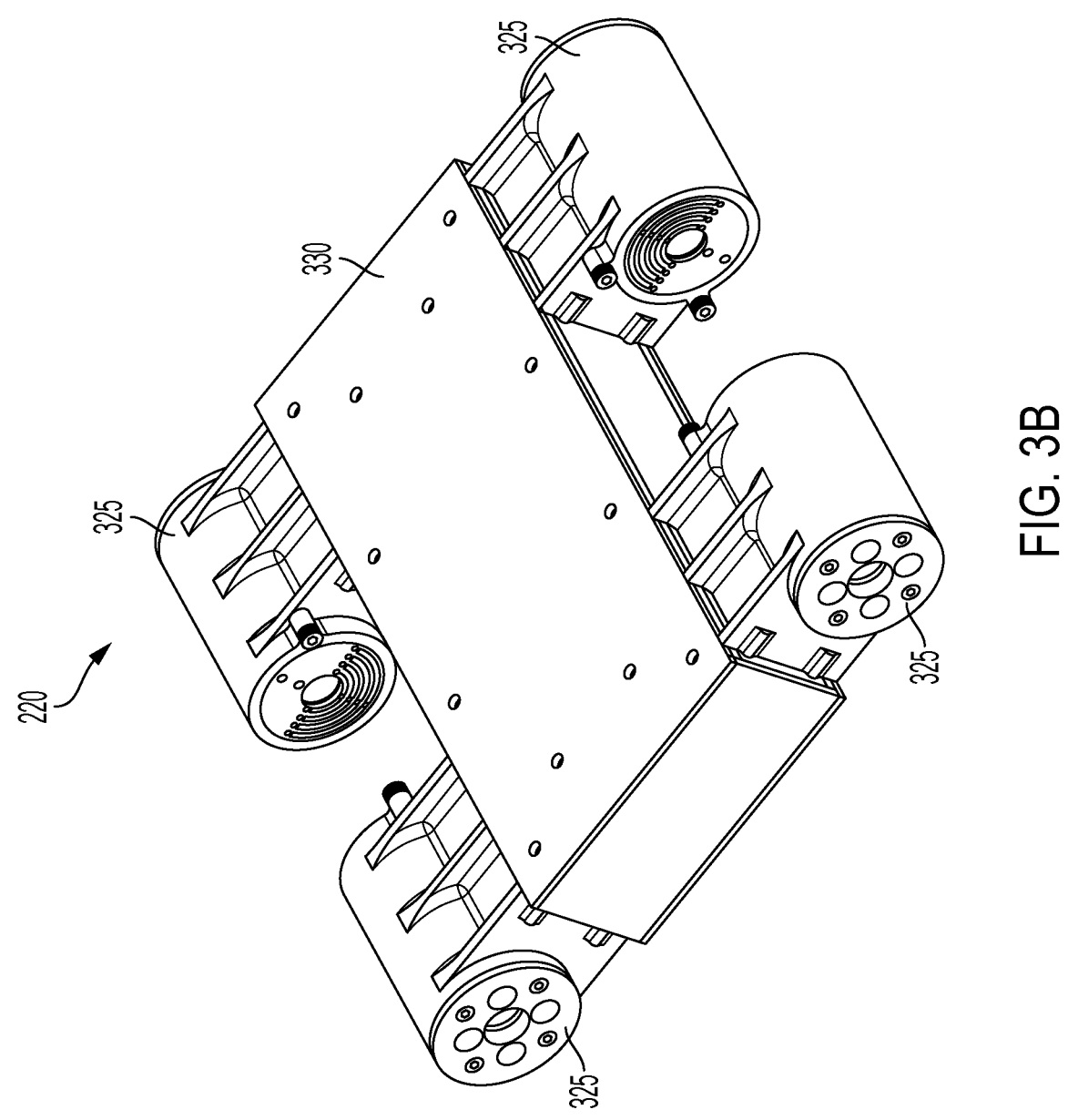
FIG. 3B illustrates a perspective view of an example bridge component of a variable geometry chassis, according to an exemplary embodiment of the present disclosure.

Referring now to FIG. 3B, a perspective view of an example bridge component 220 of a variable geometry chassis 110 is illustratively depicted, in accordance with an exemplary embodiment of the present disclosure.

According to an exemplary embodiment, the bridge component 220 may be a component of the variable geometry chassis 110 that is between the main component 210 and the end component 230. According to an exemplary embodiment, the bridge component 220 may comprise a bridge component body 330 and one or more passive components 325 of rotational locking mechanisms 240. According to an exemplary embodiment, the one or more passive components 325 of the rotational locking mechanisms 240 may be configured to engage with, and rotationally couple with, the one or more active components 320 and passive component 325 of the rotational locking mechanisms 240 of the main component 210 and the one or more active components 320 and passive component 325 of the rotational locking mechanisms 240 of an end component 230.

Figure 3C:
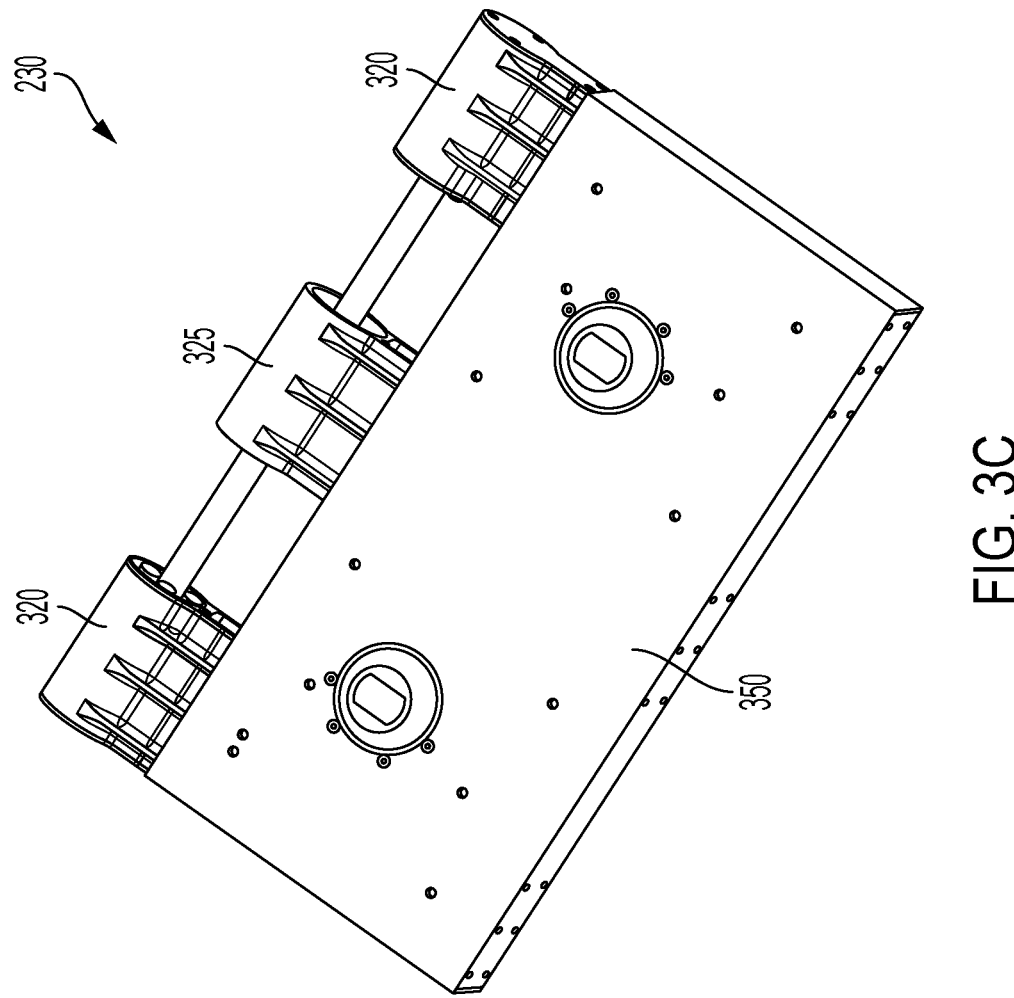
FIG. 3C illustrates a perspective view of an example end component of a variable geometry chassis, according to an exemplary embodiment of the present disclosure.

Referring now to FIG. 3C, a perspective view of an example end component 230 of a variable geometry chassis 110 is illustratively depicted, in accordance with an exemplary embodiment of the present disclosure.

According to an exemplary embodiment, the end component 230 may be an end component of the variable geometry chassis 110. According to an exemplary embodiment, the end component 230 may comprise an end component body 350, one or more active components 320 of a rotational locking mechanism 240, and one or more passive components 325 of rotational locking mechanisms 240. According to an exemplary embodiment, the one or more active components 320 and passive components 325 of the rotational locking mechanisms 240 may be configured to engage with, and rotationally couple with, the one or more passive components 325 of the rotational locking mechanisms 240 of the bridge component 220. According to an exemplary embodiment, each of the one or more leg-wheel components 120 may be configured to be coupled to the end component 230.

According to an exemplary embodiment, the variable geometry chassis 110 may be configurable in different geometries by rotating at least two constituent components relative to each other, and locking the relative placement of the rotated components such that the components of the variable chassis 110 may be fixed with respect to each other. It should be appreciated that the reconfiguration of the variable geometry chassis 110 may be performed while the hybrid vehicle 100 is stationary and/or in motion (e.g., wheeled or walking).

Figure 4A:
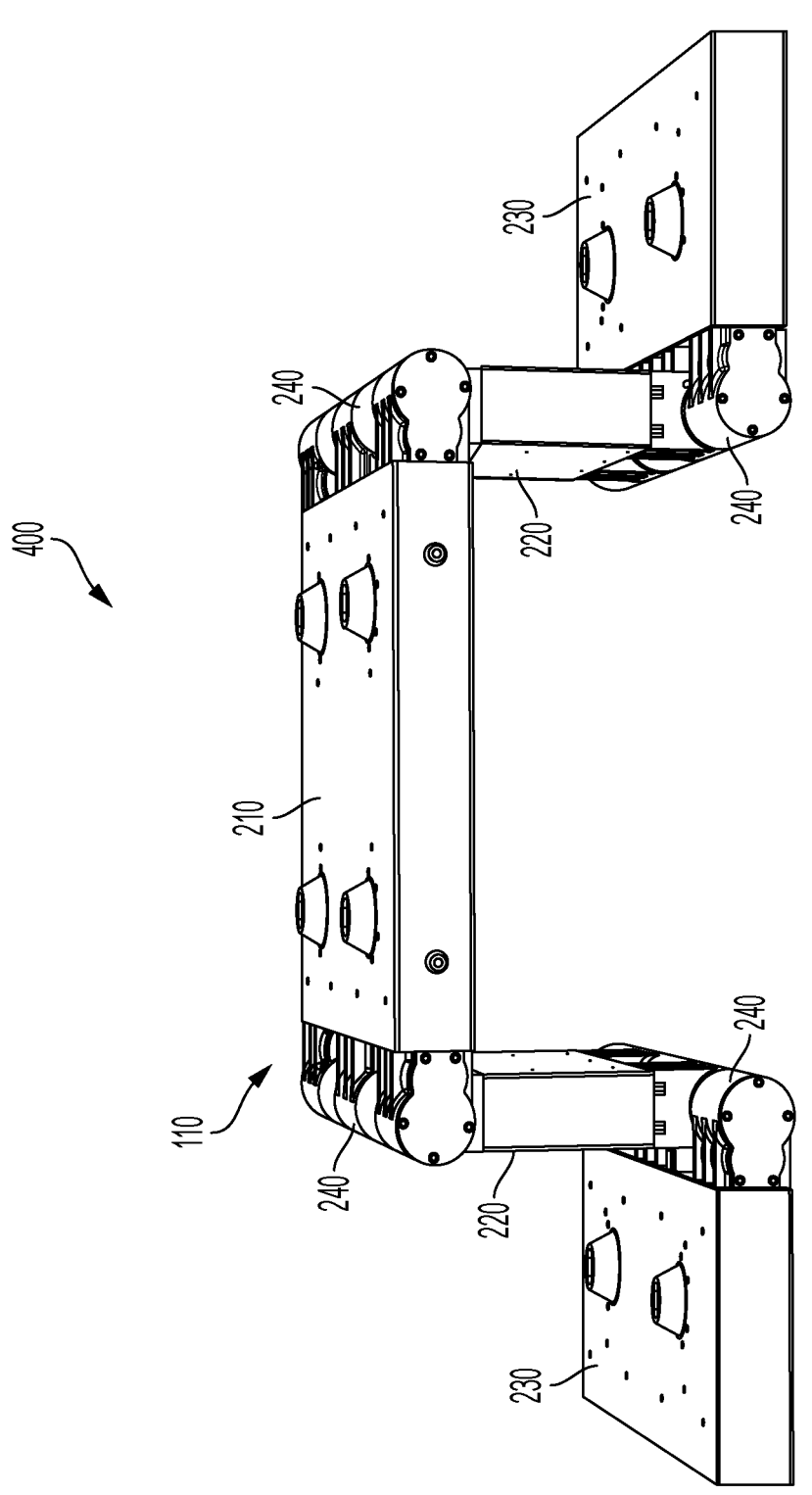
FIG. 4A illustrates a perspective view of an example variable geometry chassis in an arch configuration, according to an exemplary embodiment of the present disclosure.

Referring now to FIG. 4A, a perspective view of an example variable geometry chassis 110 in an arch configuration 400 is illustratively depicted, in accordance with an exemplary embodiment of the present disclosure.

According to an exemplary embodiment, in an arch configuration 400, the main component 210 is higher than the end components 230, giving the variable geometry chassis 110 an "arched" appearance. According to an exemplary embodiment, in the arch configuration 400, the rotational locking mechanisms 240 may be fixed at substantially 90 degree angles. It is noted, however, that other suitable fixed angles may be incorporated, while maintaining the spirit and functionality of the present disclosure. According to an exemplary embodiment, when in an arched configuration 400, the variable geometry chassis 110 may be configured to carry objects and/or other items at a higher position than other configurations, and/or may be configured to allow for placement of objects or tools under the variable geometry chassis 110 (e.g., for monitoring, grooming, and/or levelling the underlying terrain).

Figure 4B:
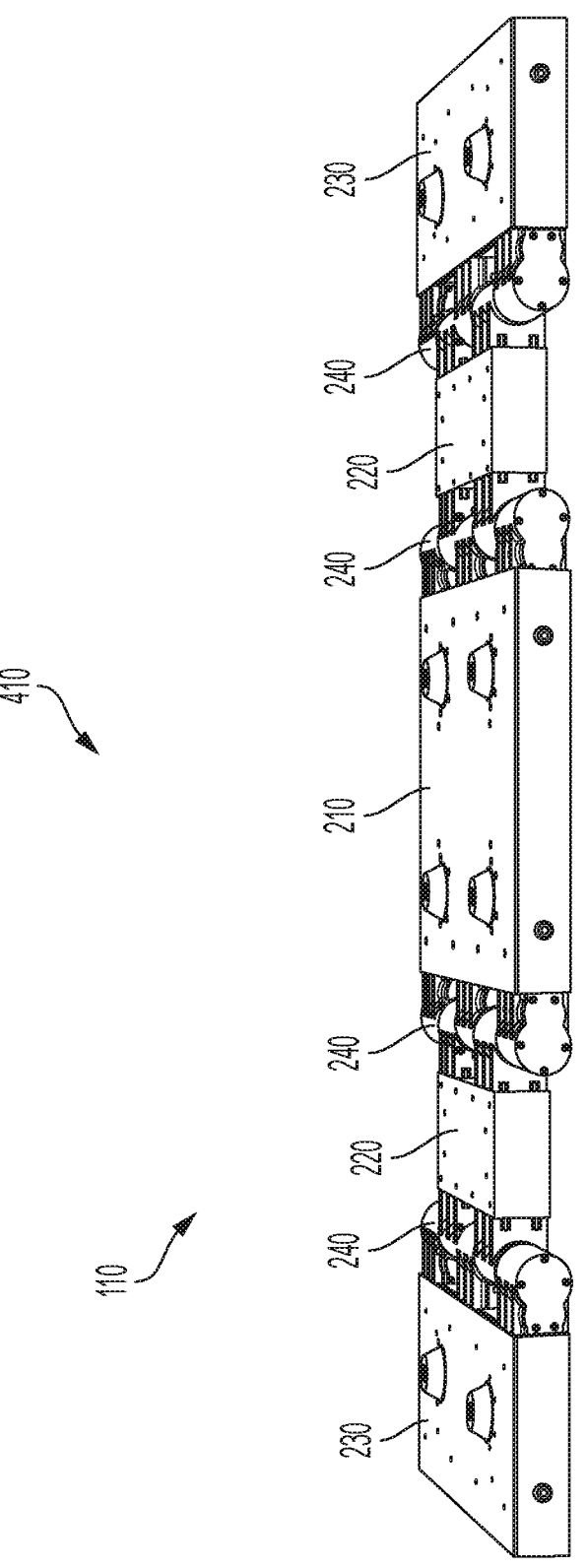
FIG. 4B illustrates a perspective view of an example variable geometry chassis in a flat configuration, according to an exemplary embodiment of the present disclosure.

Referring now to FIG. 4B, a perspective view of an example variable geometry chassis 110 in a flat configuration 410 is illustratively depicted, in accordance with an exemplary embodiment of the present disclosure.

According to an exemplary embodiment, in the flat configuration 410, the main component 210, the bridge components 220, and the end components 230 are on a same level relative to each other, giving the variable geometry chassis 110 a flatbed appearance. According to an exemplary embodiment, in the flat configuration 410, the rotational locking mechanisms 240 may be fixed at substantially 180 degree angles. According to an exemplary embodiment, when in the flat configuration 410, the variable geometry chassis 110 may be configured to carry larger objects than in other configurations, as the surface of the variable geometry chassis 110 may be larger. According to an exemplary embodiment, as with the arch configuration 400, although at a decreased height, objects or tools may be placed under the variable geometry chassis 110 according to a desired use in the flat configuration 410.

Figure 4C:
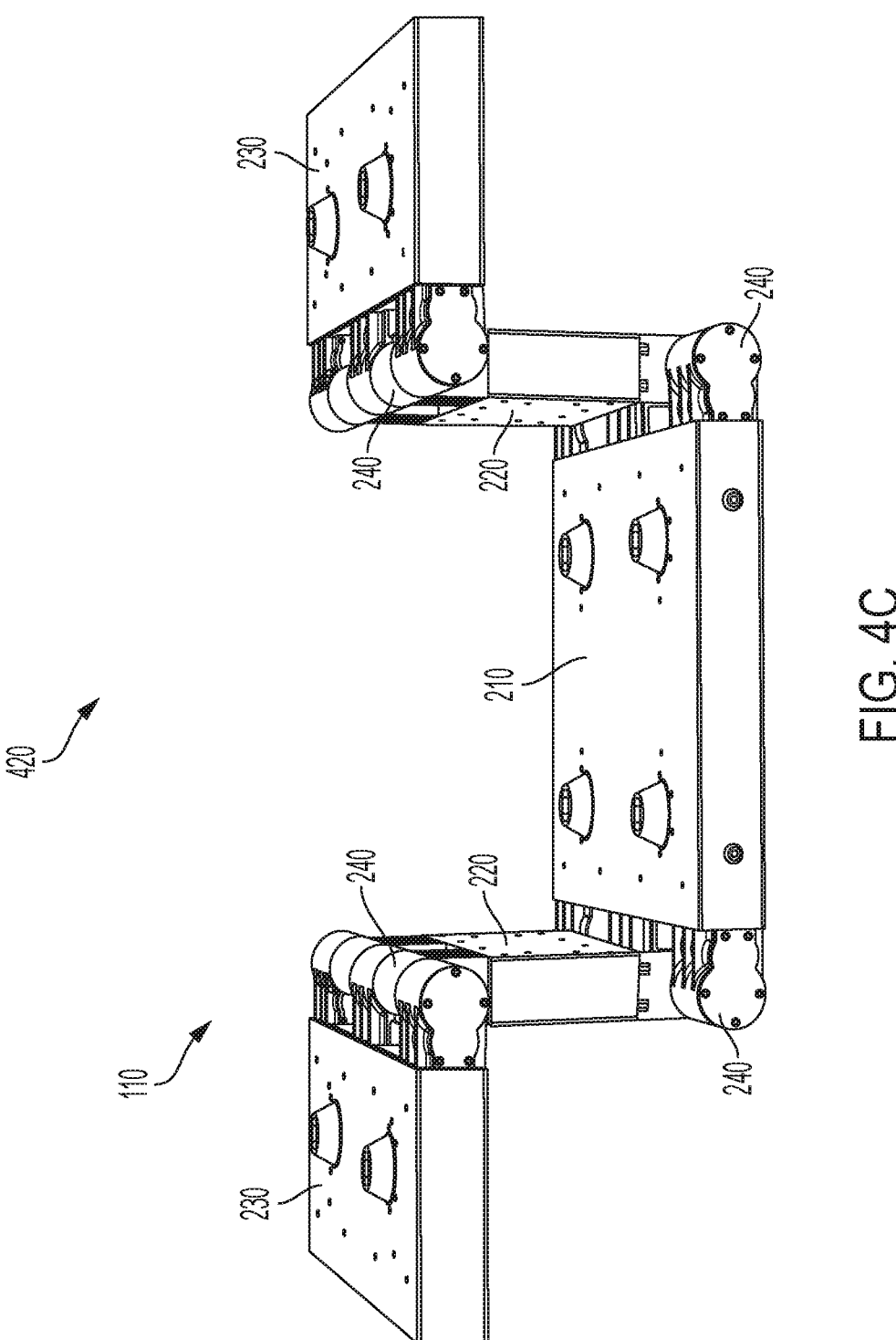
FIG. 4C illustrates a perspective view of an example variable geometry chassis in a tub configuration, according to an exemplary embodiment of the present disclosure.

Referring now to FIG. 4C, a perspective view of an example variable geometry chassis 110 in a tub configuration 420 is illustratively depicted, in accordance with an exemplary embodiment of the present disclosure.

According to an exemplary embodiment, in the tub configuration 420, the main component 210 of the variable geometry chassis 110 is lower than the end components 230, giving the variable geometry chassis 110 a "tub" appearance. According to an exemplary embodiment, in the tub configuration 420, the rotational locking mechanisms 240 may be fixed at substantially 90 degree angles. It is noted, however, that other suitable fixed angles may be incorporated, while maintaining the spirit and functionality of the present disclosure. According to an exemplary embodiment, the tub configuration 420 may be configured to provide the variable geometry chassis 110 with a low center of gravity, allowing for the transport of large objects or loads without sacrificing stability of the hybrid vehicle 100. According to an exemplary embodiment, one or more objects may be placed on the main component 210 and the end components 230, allowing for the transport of different sized objects at different heights.

Figure 5A:
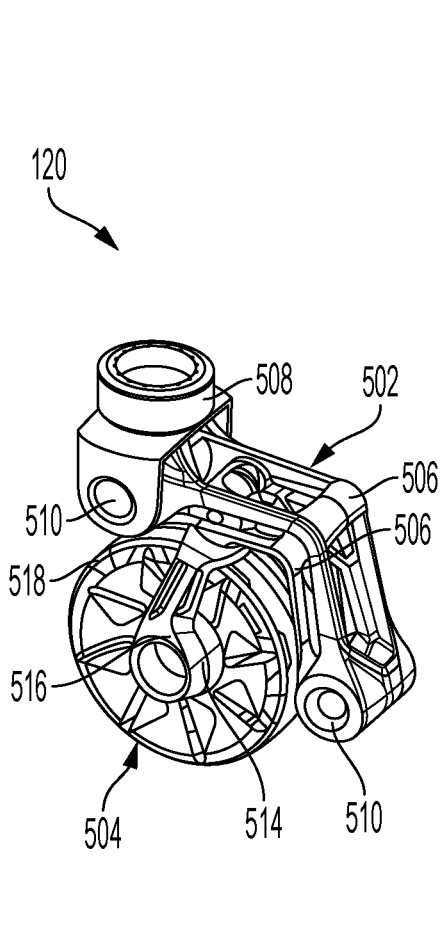
FIGS. 5A and 5B are diagrams illustrating a leg-wheel component in retracted position (FIG. 5A) and an extended position (FIG. 5B, according to exemplary embodiments of the present disclosure.

Referring now to FIGS. 5A and SB, an example leg-wheel component 120 in a retracted position (FIG. 5A) and an extended position (FIG. 5B), is illustratively depicted, in accordance with an exemplary embodiment of the present disclosure.

Various embodiments of such leg-wheel components 120 are described, e.g., in co-pending U.S. patent application Ser. No. 16/743,310 (U.S. Patent Application Publication No. 2020/0216127). It is noted that other configurations of one or more leg-wheel components 120 may be incorporated into the present disclosure, while maintaining the spirit and functionality of the present disclosure.

The leg-wheel component 120 may comprise a leg component 502 and a wheel component 504. The wheel component 504 may be coupled to the leg component 502.

According to an exemplary embodiment, the leg-wheel component 120 may comprise a coupling component 508 configured to couple the leg-wheel component 120 to the chassis 110 (e.g., end components 230) and/or other suitable components of the hybrid vehicle (e.g., hybrid vehicle 100).

According to an exemplary embodiment, the leg component 502 may be divided into one or more segments 506. The one or more segments 506, coupling component 508, and/or the wheel component 504 may be configured to rotate about each other via one or more movable joint components 510.

According to an exemplary embodiment, the leg-wheel component 120 may comprise one or more suspension systems 512 (e.g., springs, shock absorbers, etc).

According to an exemplary embodiment, the wheel component 504 may be configured to rotate along an axis while coupled to the leg component 502, enabling the hybrid vehicle to move along a surface in contact with the wheel component 504. According to an exemplary embodiment, the leg-wheel component 120 may comprise one or more braking mechanisms for preventing and/or decreasing rotation of the wheel component 504.

Figure 5B:
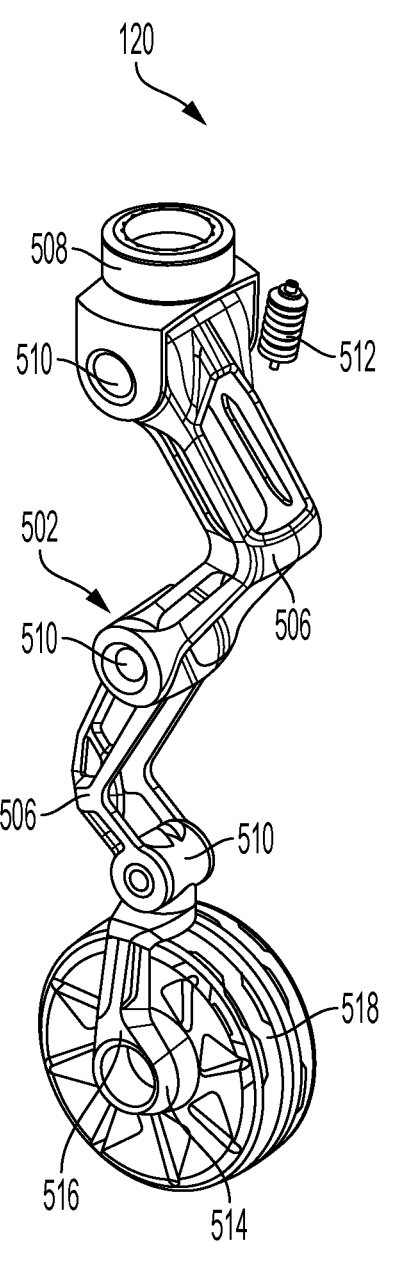

With reference to FIG. 5A, the leg-wheel component 120 is in a retracted state, with the leg-wheel component 120 being configured and positioned to provide wheeled locomotion. With reference to FIG. 5B, the leg-wheel component 120 is in an extended state, with the leg-wheel component 120 being configured and positioned to provide walking locomotion.

According to an exemplary embodiment, wheeled locomotion may be available for use in situations where traditional vehicle travel using rolling wheels 504 is available (e.g., roads and highways). Wheeled locomotion is efficient, when available, for conveyance of a vehicle (e.g., hybrid vehicle 100) between destinations. According to some exemplary embodiments, the leg-wheel components 120 may be configured to allow for active height adjustment of the hybrid vehicle, enabling the hybrid vehicle to go, e.g., from street use to off-road use.

According to an exemplary embodiment, in walking locomotion, the hybrid vehicle may be configured to walk up elevations and terrain that is not surmountable using wheeled locomotion. In some instances, walking locomotion may allow for nimble and quiet motion, relative to wheeled locomotion. The hybrid vehicle may also be configured to move laterally, allowing for quadrupedal ambulation. According to an exemplary embodiment, the leg-wheel components 120 may be configured to provide a springing action and/or a jumping action to propel the hybrid vehicle away from a traversal surface.

According to an exemplary embodiment, the leg-wheel components 120 may comprise one or more in-wheel motors 514 configured to power movement of the wheel component 504 and/or the leg component 502. The use of the in-wheel motors 514 frees the suspension 512 from traditional axles and allows ambulation, but also increases the driving performance and adaptability.

By using the wheels 504 as feet, the electric motors 514 may be configured to lock for stable ambulation, but also may be configured to enable slow torque controlled rotation for micro movements when climbing or during self-recovery. According to some exemplary embodiments, the wheel 504 of the leg-wheel component 120 may be configured to rotate 180 degrees perpendicular to a hub 516, not only allowing leaning capability while driving, but also giving the wheels 504 enhanced positioning potential when a tire 518 is locked and in a walking mode. The wheel 504 may be configured to turn 90 degrees and even may be configured to be used as a wide foot pad, lowering the hybrid vehicle's pounds per square inch (PSI) footprint when walking over loose materials or fragile surfaces, similar to that of a snowshoe.

Figure 5C:
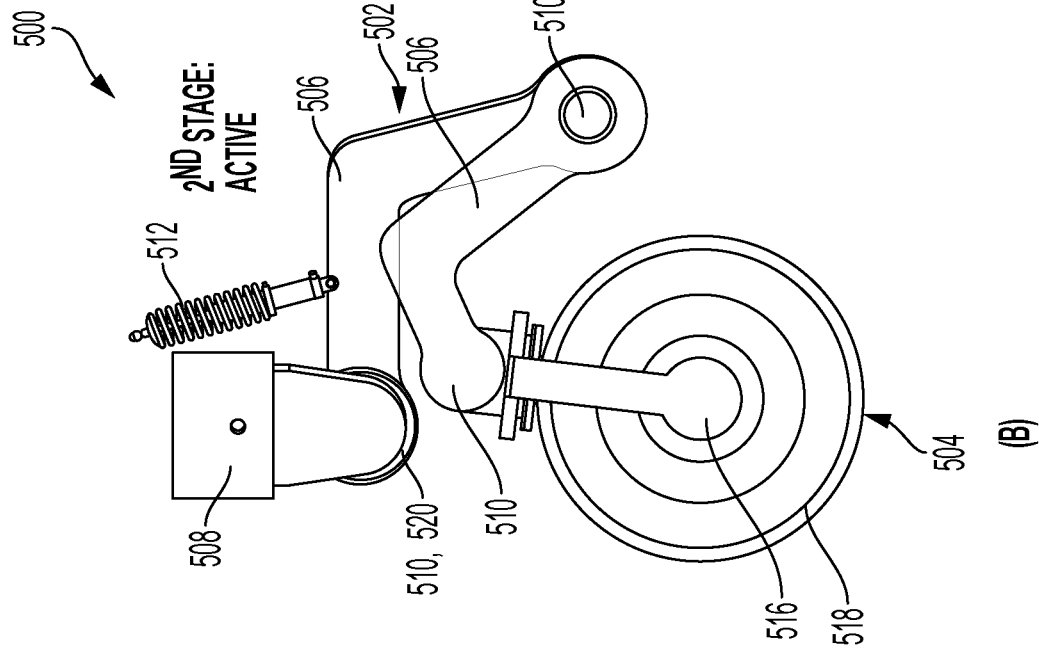
FIG. 5C illustrates a diagram illustrating the low range of motion suspension stage and the high range of motion suspension stage, according to exemplary embodiments of the present disclosure.
Figure 5C:
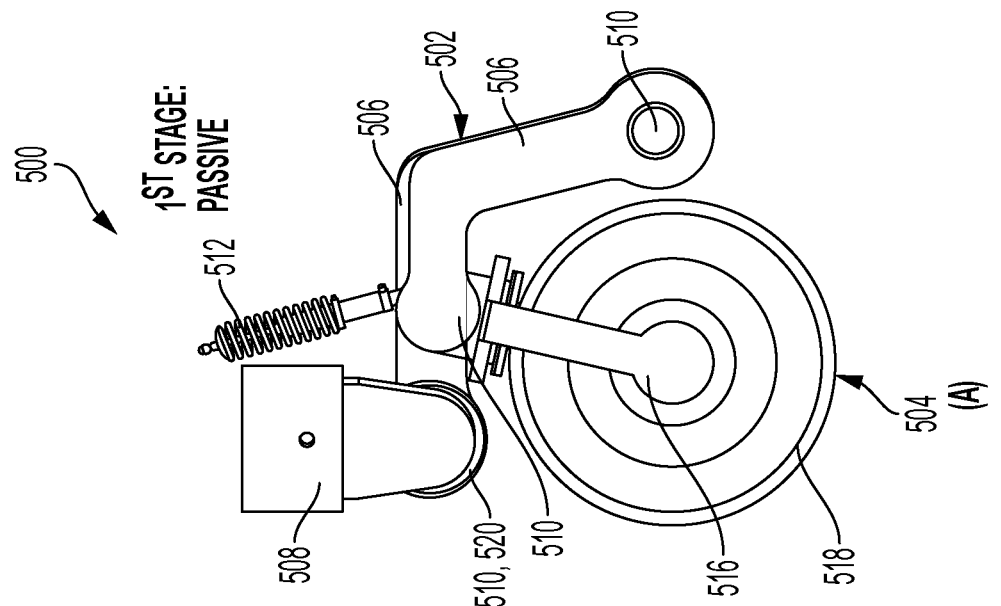

Referring now to FIG. 5C a diagram indicating a low range of motion suspension stage ((A), a passive stage), and a high range of motion suspension stage ((B), an active stage), of a leg-wheel component 120 is illustratively depicted, in accordance with an exemplary embodiment of the present disclosure.

According to an exemplary embodiment, the leg-wheel component 120 (also referred to herein as a "hybrid vehicle traversal component" or a "leg-wheel component") may be configured to provide two stage suspension: a first, low range of motion suspension stage, when the leg-wheel component 120 is in a retracted position (A), and a second, high range of motion suspension stage, when the leg-wheel component 120 is in an extended position (B).

According to an exemplary embodiment, in the low range of motion suspension stage, the suspension system 512 (e.g., a coil-over suspension) may be utilized and engaged when the leg-wheel component 120 is in a retracted position. According to an exemplary embodiment, while in the low range of motion suspension state, a knee joint component 520 of the leg-wheel component 120 may be relaxed, while the remaining joints 510 of the leg-wheel component 120 may be locked. During the low range of motion suspension stage, the leg-wheel component 120 may be configured to handle high-frequency vibrations through the chassis-mounted suspension system 512. According to an exemplary embodiment, when the leg-wheel component 120 is retracted and the low range of motion suspension stage is enabled, the hybrid vehicle (e.g., hybrid vehicle 100) may be configured to provide 0 to 5 inches of suspension during wheeled locomotion. It is noted, however, that other amounts of suspension may be incorporated while maintaining the spirit and functionality of the present disclosure.

According to an exemplary embodiment, in the high range of motion suspension stage, the suspension system 512 (e.g., the coil-over suspension) may be disengaged when the leg-wheel component 120 is in an extended or actuated position. For example, the suspension system 512 may be configured to remain with the chassis during the high range of motion suspension stage, and the knee joint 520 may be driven by a motor to provide suspension. According to an exemplary embodiment, during the high range of motion suspension stage, the leg-wheel component 120 may be configured to support advanced driving dynamics through the capabilities of a motor at the knee joint 520. According to an exemplary embodiment, when the leg-wheel component 120 is extended and the high range of motion suspension stage is enabled, the hybrid vehicle (e.g., hybrid vehicle 100) may be configured to provide 5 to 50 inches of suspension during walking locomotion. It is noted, however, that other amounts of suspension may be incorporated while maintaining the spirit and functionality of the present disclosure.

Figure 6:
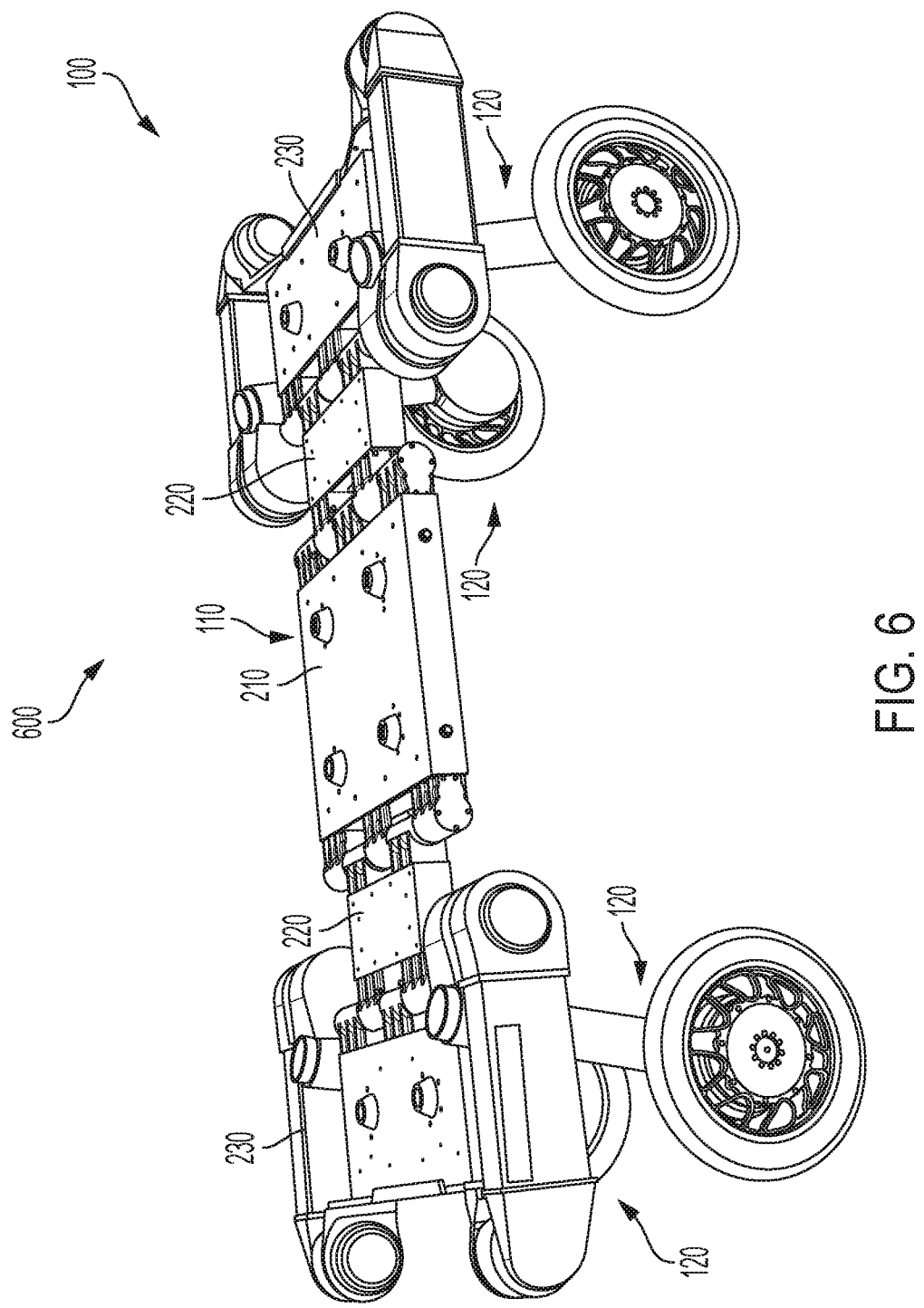
FIG. 6 illustrates a perspective view of an example hybrid vehicle with a variable geometry chassis in a flat configuration, according to an exemplary embodiment of the present disclosure.

Referring now to FIG. 6 a perspective view of an example hybrid vehicle 100 with a variable geometry chassis 110 in a flat configuration 600 is illustratively depicted, in accordance with an exemplary embodiment of the present disclosure.

According to an exemplary embodiment, in the flat configuration 600, the main component 210, the bridge components 220, and the end components 230 may be on the same level relative to each other, giving the variable geometry chassis 110 a flatbed appearance. According to an exemplary embodiment, when in the flat configuration 600, the variable geometry chassis 110 may be configured to carry larger objects than in the other configurations, as the surface of the variable geometry chassis 110 is larger. According to an exemplary embodiment, as with the arch configuration, although at a decreased height, objects or tools may be placed under the variable geometry chassis 110 according to a desired use.

Figure 7:
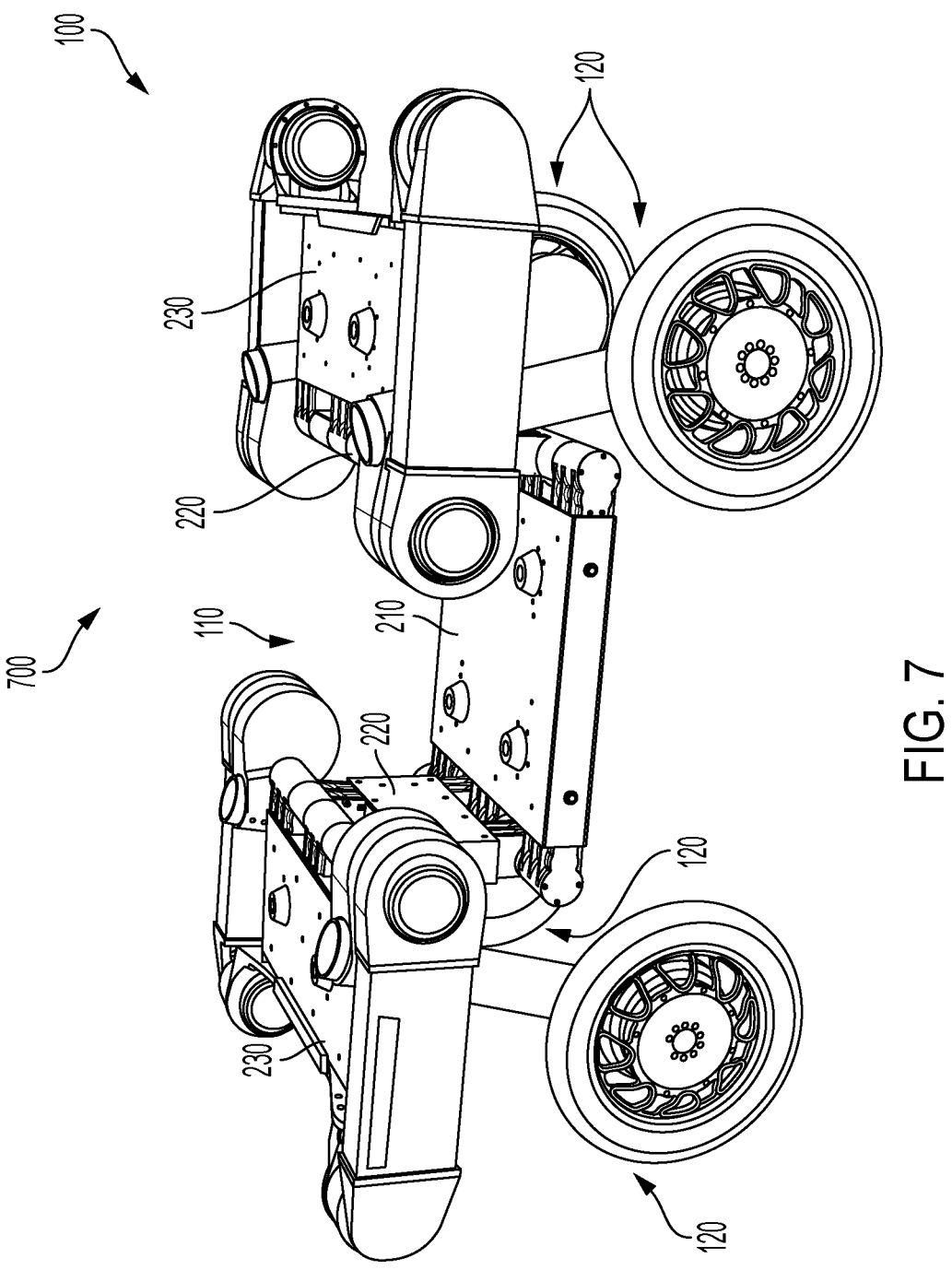
FIG. 7 illustrates a perspective view of an example hybrid vehicle with a variable geometry chassis in a tub configuration, according to an exemplary embodiment of the present disclosure.

Referring now to FIG. 7, a perspective view of an example hybrid vehicle 100 with a variable geometry chassis 110 in a tub configuration 700 is illustratively depicted, in accordance with an exemplary embodiment of the present disclosure.

According to an exemplary embodiment, in the tub configuration 700, the main component 210 is lower than the end components 230, giving the variable geometry chassis 110 the "tub" appearance. The tub configuration 700 provides the variable geometry chassis 110 with a low center of gravity, allowing for the transport of large objects or loads without sacrificing stability of the hybrid vehicle 100. According to an exemplary embodiment, in the tub configuration 700, objects may be placed on the main component 210 and the end components 230, allowing for transport of different sized objects.

Figure 8A:
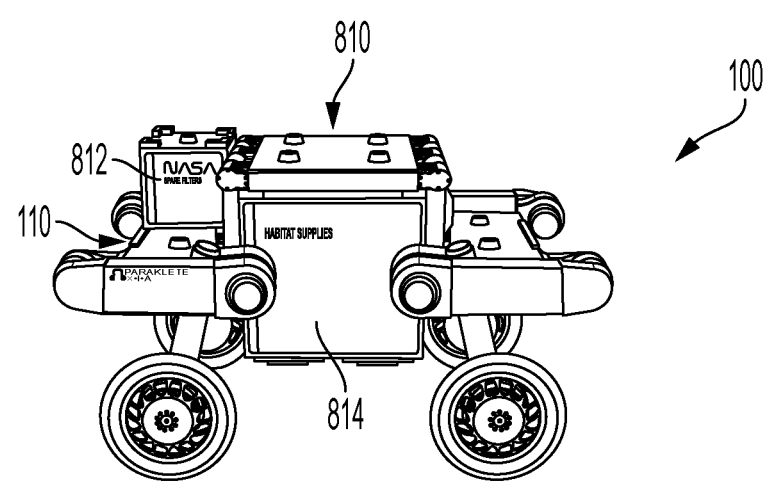
FIG. 8A illustrates a perspective view of an example hybrid vehicle with a variable geometry chassis in an arch configuration loaded with cargo, according to an exemplary embodiment of the present disclosure.

Referring now to FIG. 8A, a perspective view of an example hybrid vehicle 100 with a variable geometry chassis 110 in an arch configuration 810 loaded with cargo is illustratively depicted, in accordance with an exemplary embodiment of the present disclosure.

In the illustrated embodiment, the hybrid vehicle 100 is laden with cargo 812 and 814, where the cargo 812 is smaller than the cargo 814. For example, the cargo 812 may comprise spare filters and the cargo 814 may comprise habitat supplies. The cargo 812 is positioned on an end component 230 of the variable geometry chassis 110, and the cargo 814 is positioned under the main component 210 of the variable geometry chassis 110. It should be appreciated that the cargo 814 may be connected to the bottom of the main component 210 and/or may be connected to the variable geometry chassis 110 using other suitable means such as, e.g., cables or straps connected to the variable geometry chassis 110.

Figure 8B:
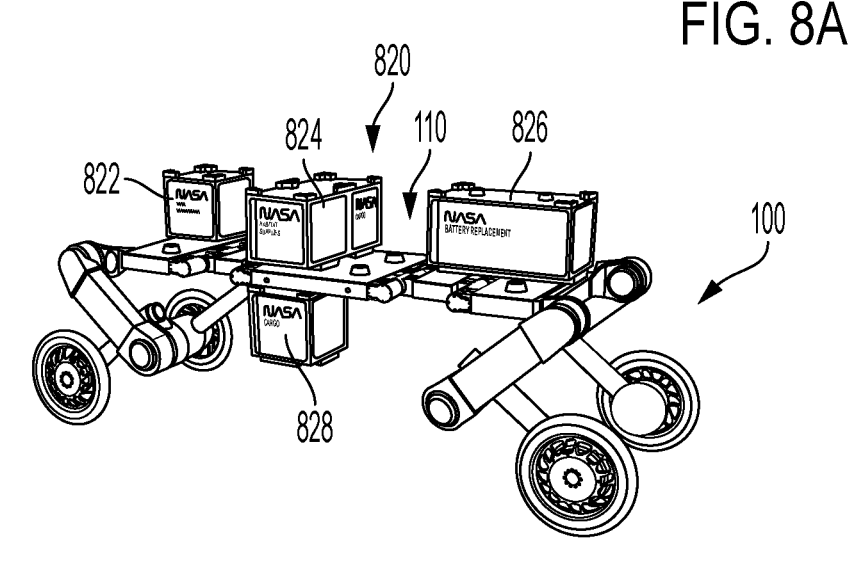
FIG. 8B illustrates a perspective view of an example hybrid vehicle with a variable geometry chassis in a flat configuration loaded with cargo, according to an exemplary embodiment of the present disclosure.

Referring now to FIG. 8B, a perspective view of an example hybrid vehicle 100 with a variable geometry chassis 110 in a flat configuration 820 loaded with cargo is illustratively depicted, in accordance with an exemplary embodiment of the present disclosure.

In the illustrated embodiment, the hybrid vehicle 100 is laden with cargo 822, 824, 826, and 828. For example, the cargo 822 may comprise drill attachments, the cargo 824 may comprise regolith samples, the cargo 826 may comprise a battery replacement, and the cargo 828 may comprise random cargo. The cargo 822, 824, and 826 are positioned on a top side of the variable geometry chassis 110, and the cargo 828 is positioned under the variable geometry chassis 110. It should be appreciated that the cargo 828 may be connected to the bottom of the main component 210, or may be connected to the variable geometry chassis 110 using other suitable means, such as, e.g., cables or straps connected to the variable geometry chassis 110.

Figure 8C:
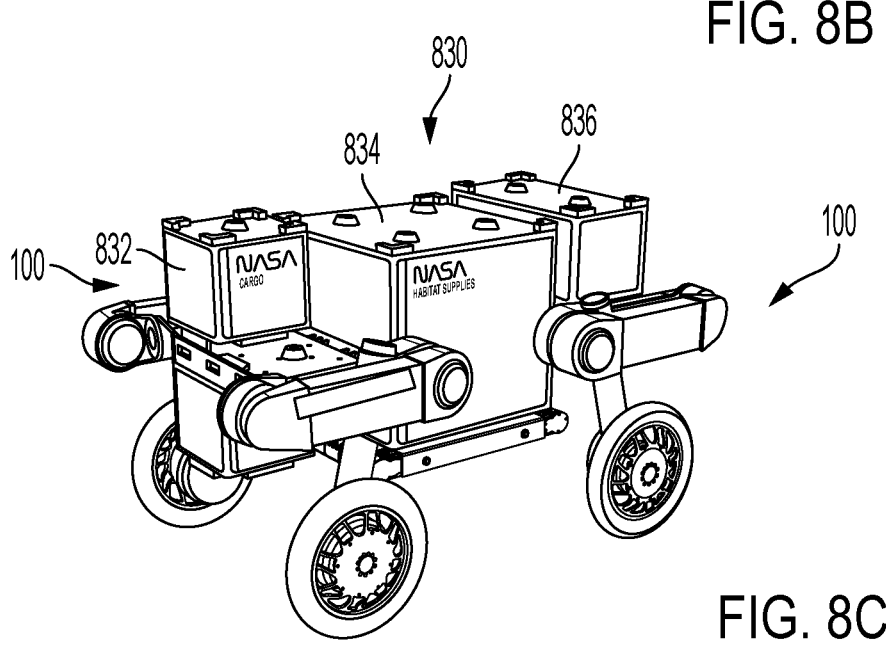
FIG. 8C illustrates a perspective view of an example hybrid vehicle with a variable geometry chassis in a tub configuration loaded with cargo, according to an exemplary embodiment of the present disclosure.

Referring now to FIG. 8C, a perspective view of an example hybrid vehicle 100 with a variable geometry chassis 110 in a tub configuration 830 loaded with cargo is illustratively depicted, in accordance with an exemplary embodiment of the present disclosure.

In the illustrated embodiment, the hybrid vehicle 100 is laden with cargo 832, 834, and 836, where the cargo 832 and 836 are smaller than the cargo 834. For example, the cargo 832 may comprise random cargo and the cargo 834 may comprise habitat supplies. The cargo 832 is positioned on the end component 230 of the variable geometry chassis 110, the cargo 834 is positioned on the main component 210 of the variable geometry chassis 110, and the cargo 836 is positioned on the other end component 230 of the variable geometry chassis 110.

Figure 9:
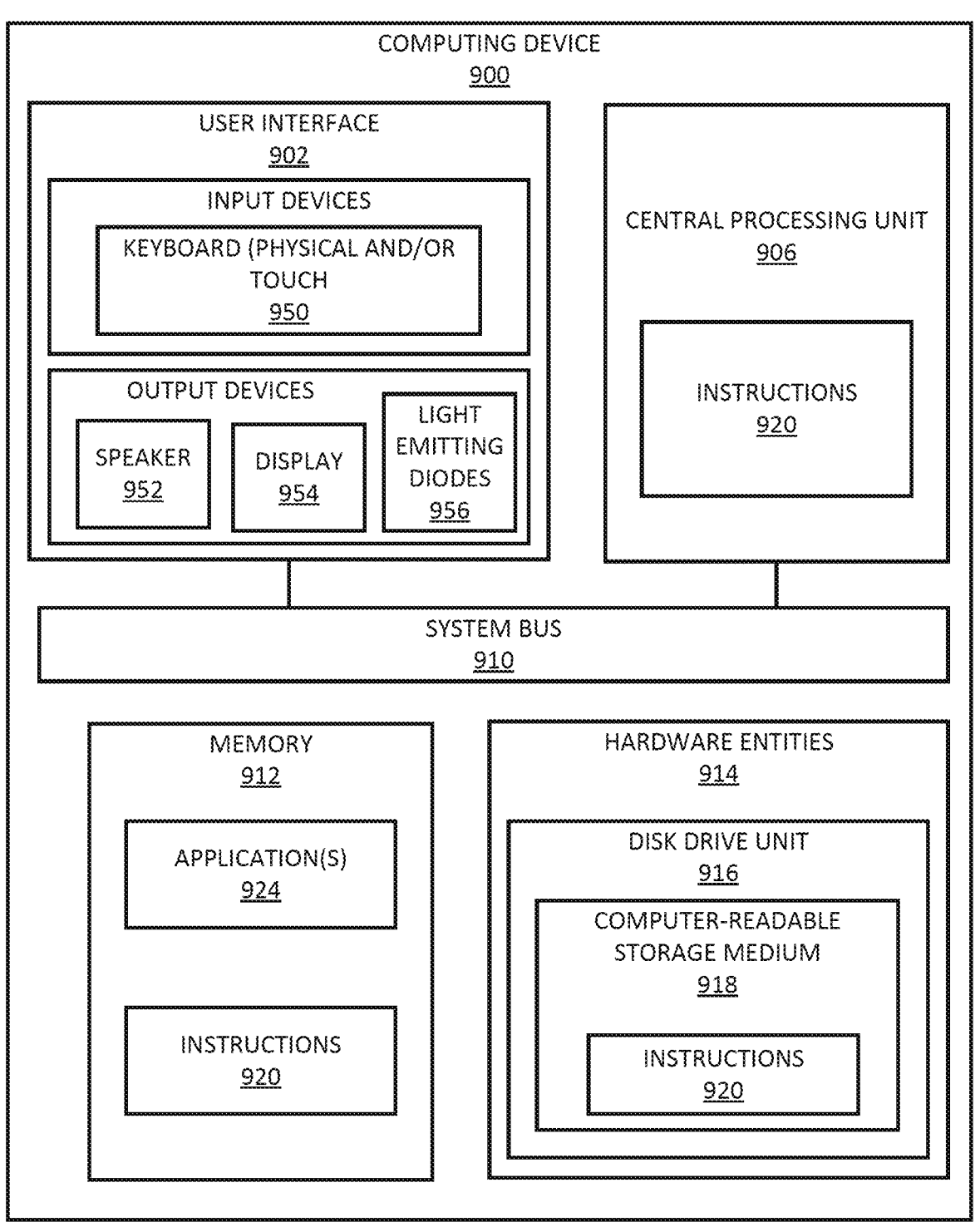
FIG. 9 illustrates example elements of a computing device, according to an exemplary embodiment of the present disclosure.

Referring now to FIG. 9, an illustration of an example architecture for a computing device 900 is provided.

According to an exemplary embodiment, one or more functions of the present disclosure may be implemented by a computing device such as, e.g., computing device 900 or a computing device similar to computing device 900.

The hardware architecture of FIG. 9 represents one example implementation of a representative computing device configured to perform and/or implement at least a portion of the functions of the system(s) described herein (e.g., hybrid vehicle 100).

Some or all components of the computing device 900 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 9, the computing device 900 may comprise a user interface 902, a Central Processing Unit ("CPU") 906, a system bus 910, a memory 912 connected to and accessible by other portions of computing device 900 through system bus 910, and hardware entities 914 connected to system bus 910. The user interface may comprise input devices and output devices, which may be configured to facilitate user-software interactions for controlling operations of the computing device 900. The input devices may comprise, but are not limited to, a physical and/or touch keyboard 940. The input devices may be connected to the computing device 900 via a wired or wireless connection (e.g., a Bluetooth® connection). The output devices may comprise, but are not limited to, a speaker 942, a display 944, and/or light emitting diodes 946.

At least some of the hardware entities 914 may be configured to perform actions involving access to and use of memory 912, which may be a Random Access Memory (RAM), a disk driver and/or a Compact Disc Read Only Memory (CD-ROM), among other suitable memory types. Hardware entities 914 may comprise a disk drive unit 916 comprising a computer-readable storage medium 918 on which may be stored one or more sets of instructions 920 (e.g., programming instructions such as, but not limited to, software code) configured to implement one or more of the methodologies, procedures, or functions described herein. The instructions 920 may also reside, completely or at least partially, within the memory 912 and/or within the CPU 906 during execution thereof by the computing device 900.

The memory 912 and the CPU 906 may also constitute machine-readable media. The term "machine-readable media", as used here, refers to a single medium or multiple media (e.g., a centralized or distributed database, and/or associated caches and servers) that store the one or more sets of instructions 920. The term "machine-readable media", as used here, also refers to any medium that is capable of storing, encoding or carrying a set of instructions 920 for execution by the computing device 900 and that cause the computing device 900 to perform any one or more of the methodologies of the present disclosure.

Figure 10:
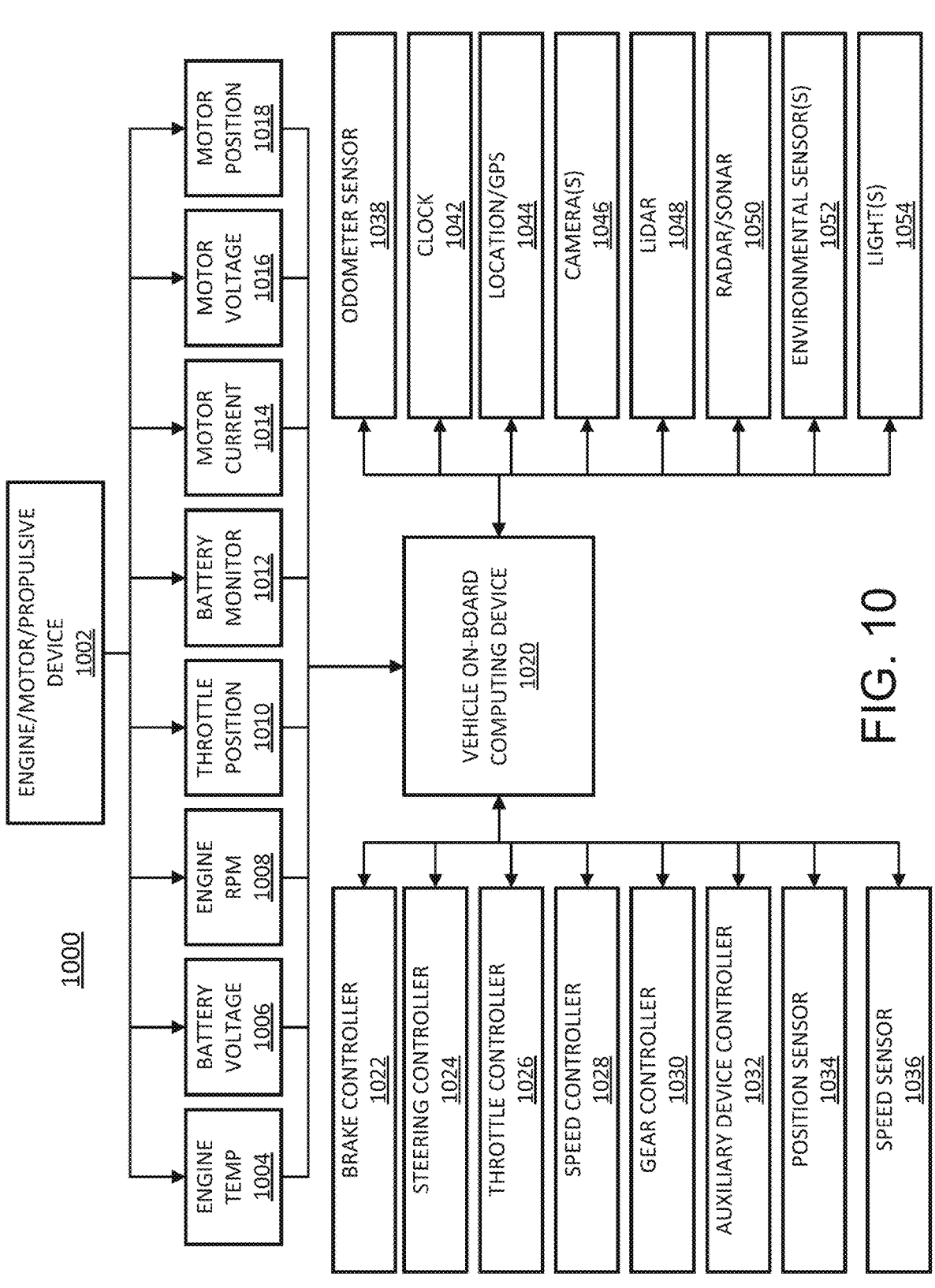
FIG. 10 illustrates an example architecture of a vehicle, according to an exemplary embodiment of the present disclosure.

Referring now to FIG. 10, an example vehicle system architecture 1000 for a vehicle is provided, in accordance with an exemplary embodiment of the present disclosure.

The hybrid vehicle 100 may be configured to be incorporated in or with a vehicle having the same or similar system architecture as that shown in FIG. 10. Thus, the following discussion of vehicle system architecture 1000 is sufficient for understanding one or more components of the hybrid vehicle 100.

As shown in FIG. 10, the vehicle system architecture 1000 may comprise an engine, motor or propulsive device (e.g., a thruster) 1002 and various sensors 1004-1018 for measuring various parameters of the vehicle system architecture 1000. In gas-powered or hybrid vehicles having a fuel-powered engine, the sensors 1004-1018 may comprise, for example, an engine temperature sensor 1004, a battery voltage sensor 1006, an engine revolutions per minute (RPM) sensor 1008, and/or a throttle position sensor 1010. If the vehicle is an electric or hybrid vehicle, then the vehicle may comprise an electric motor, and accordingly may comprise sensors such as a battery monitoring system 1012 (to measure current, voltage and/or temperature of the battery), motor current 1014 and voltage 1016 sensors, and motor position sensors such as resolvers and encoders 1018.

Operational parameter sensors that are common to both types of vehicles may comprise, for example: a position sensor 1034 such as an accelerometer, gyroscope and/or inertial measurement unit; a speed sensor 1036; and/or an odometer sensor 1038. The vehicle system architecture 1000 also may comprise a clock 1042 that the system uses to determine vehicle time and/or date during operation. The clock 1042 may be encoded into the vehicle on-board computing device 1020, it may be a separate device, or multiple clocks may be available.

The vehicle system architecture 1000 also may comprise various sensors that operate to gather information about the environment in which the vehicle is traveling. These sensors may comprise, for example: a location sensor 1044 (for example, a Global Positioning System (GPS) device); object detection sensors such as one or more cameras 1046; a LIDAR sensor system 1048; and/or a RADAR and/or a sonar system 1050. The sensors also may comprise environmental sensors 1052 such as, e.g., a humidity sensor, a precipitation sensor, a light sensor, and/or ambient temperature sensor. The object detection sensors may be configured to enable the vehicle system architecture 1000 to detect objects that are within a given distance range of the vehicle in any direction, while the environmental sensors 1052 may be configured to collect data about environmental conditions within the vehicle's area of travel. According to an exemplary embodiment, the vehicle system architecture 1000 may comprise one or more lights 1054 (e.g., headlights, flood lights, flashlights, etc.).

During operations, information may be communicated from the sensors to an on-board computing device 1020 (e.g., computing device 900 of FIG. 9). The on-board computing device 1020 may be configured to analyze the data captured by the sensors and/or data received from data providers and may be configured to optionally control operations of the vehicle system architecture 1000 based on results of the analysis. For example, the on-board computing device 1020 may be configured to control: braking via a brake controller 1022; direction via a steering controller 1024; speed and acceleration via a throttle controller 1026 (in a gas-powered vehicle) or a motor speed controller 1028 (such as a current level controller in an electric vehicle); a differential gear controller 1030 (in vehicles with transmissions), and/or other controllers. The brake controller 1022 may comprise a pedal effort sensor, pedal effort sensor, and/or simulator temperature sensor, as described herein.

Geographic location information may be communicated from the location sensor 1044 to the on-board computing device 1020, which may then access a map of the environment that corresponds to the location information to determine known fixed features of the environment such as streets, buildings, stop signs and/or stop/go signals. Captured images from the cameras 1046 and/or object detection information captured from sensors such as LiDAR 1048 may be communicated from those sensors to the on-board computing device 1020. The object detection information and/or captured images may be processed by the on-board computing device 1020 to detect objects in proximity to the vehicle. Any known or to be known technique for making an object detection based on sensor data and/or captured images may be used in the embodiments disclosed in this document.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified subcomponents, some of the specified components or subcomponents, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including." "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A hybrid vehicle comprising:
a variable geometry chassis, configurable into one or more of:
an arch configuration;
a flat configuration; and
a tub configuration; and
a plurality of leg-wheel components coupled to the variable geometry chassis;
wherein the plurality of leg-wheel components are collectively operable to provide wheeled locomotion and walking locomotion;
wherein the variable geometry chassis comprises a plurality of components comprising:
a main component;
a plurality of bridge components; and
a plurality of end components;
wherein the main conmonent is coupled to an end component of the plurality of end components via a bridge component of the plurality of badge components; and
wherein, in the flat configuration, the main component, the plurality of bridge components, and the plurality of end components are positioned in a same level relative to each other.

2. The hybrid vehicle of claim 1, wherein, in the arch configuration, the main component is positioned above the plurality of end components.

3. The hybrid vehicle of claim 1, wherein the variable geometry chassis further comprises a plurality of rotational locking mechanisms configured to secure the plurality of components.

4. The hybrid vehicle of claim 3, wherein the plurality of locking mechanisms are configured to rotate a relative positioning of the plurality of components.

5. The hybrid vehicle of claim 3, wherein the plurality of locking mechanisms are configured to lock the plurality of components in a fixed configuration.

6. A hybrid vehicle comprising:
a variable geometry chassis, configurable into one or more of:
an arch configuration:
a flat configuration; and
a tub configuration; and
a plurality of leg-wheel components coupled to the variable geometry chassis;
wherein the phar lity of leg-wheel components are collectively operable to provide wheeled locomotion and walking locomotion;
wherein the variable geometry chassis comprises a plurality of components, comprising:
a main component;
a plurality of bridge components, and
a plurality of end components,
wherein the main component is coupled to an end component of the plurality of end components via a bridge component of the plurality of bridge components; and
wherein, in the tub configuration, the main component is positioned below the plurality of end components.

7. A hybrid vehicle comprising:
a variable geometry chassis, comprising:
a plurality of components, comprising:
a main component;
a plurality of bridge components; and a plurality of end components; and a plurality of rotational locking mechanisms configured to secure the plurality of components; and a plurality of leg-wheel components coupled to the variable geometry chassis, wherein the plurality of leg-wheel components are collectively operable to provide wheeled locomotion and walking locomotion wherein the main component is coupled to an end component of the plurality of end components via a bridge component of the plurality of bridge components;

wherein the variable geometry chassis is configurable into one or more of:

an arch configuration;

a flat configuration; and a tub configuration; and wherein, in the flat configuration, the main component, the plurality of bridge components, and the plurality of end components are positioned in a same level relative to each other.

8. The hybrid vehicle of claim 7, wherein, in the arch configuration, the main component is positioned above the plurality of end components.

9. The hybrid vehicle of claim 7, wherein, in the tub configuration the main component is positioned below the plurality of end components.

10. The hybrid vehicle of claim 7, wherein the plurality of locking mechanisms are configured to rotate a relative positioning of the plurality of components.

11. The hybrid vehicle of claim 7, wherein the plurality of locking mechanisms are configured to lock the plurality of components in a fixed configuration.

12. The hybrid vehicle of claim 7, wherein the plurality of rotational locking mechanisms comprises a rotational locking mechanism between the main component and one of the plurality of bridge components.

13. The hybrid vehicle of claim 12, wherein:

an end of the main component is coupled to two active components and one passive component of the rotational locking mechanism, and an end of the bridge components is coupled to two passive components of the rotational locking mechanism.

14. The hybrid vehicle of claim 7, wherein the plurality of rotational locking mechanisms comprises a rotational locking mechanism between a bridge component of the plurality of bridge components and an end component of the plurality of end components.

15. The hybrid vehicle of claim 14, wherein:

an end of the bridge components is coupled to two passive components of the rotational locking mechanism, and a side of the end component is coupled to two active components and one passive component of the rotational locking mechanism.

* * * * *